US007347427B2

(12) United States Patent
Heinen

(10) Patent No.: US 7,347,427 B2
(45) Date of Patent: Mar. 25, 2008

(54) WHEEL PROVIDED WITH DRIVING MEANS

(75) Inventor: Adrianus Johannes Heinen, Apeldoorn (NL)

(73) Assignee: E-Traction Europe, B.V., Apeldoorn (NL)

(*) Notice: Subject to any disclaimer, the term of this patent is extended or adjusted under 35 U.S.C. 154(b) by 0 days.

(21) Appl. No.: 11/431,684

(22) Filed: May 10, 2006

(65) Prior Publication Data

US 2006/0213707 A1  Sep. 28, 2006

(51) Int. Cl.
*B60G 17/04* (2006.01)

(52) U.S. Cl. ........... 280/5.514; 280/5.52; 280/124.146; 280/124.154

(58) Field of Classification Search ......... 280/124.146, 280/124.135, 124.154, 5.524, 661, 791, 793, 280/690, 5.514, 5.52; 188/322.19, 282.8, 188/284; 267/221, 64.15, 66; 180/234, 180/242
See application file for complete search history.

(56) References Cited

U.S. PATENT DOCUMENTS

| 3,812,928 | A | | 5/1974 | Rockwell et al. |
| 4,075,603 | A | | 2/1978 | Snyder et al. |
| 4,274,654 | A | * | 6/1981 | Travaglio ............ 280/124.154 |
| 4,441,593 | A | * | 4/1984 | Axthammer ........... 188/322.19 |
| 4,498,551 | A | | 2/1985 | Arbisi |
| 4,520,302 | A | | 5/1985 | Hill et al. |
| 4,559,485 | A | | 12/1985 | Stephan |
| 4,800,977 | A | | 1/1989 | Boegli et al. |
| 4,822,072 | A | * | 4/1989 | Preslicka et al. ..... 280/124.154 |
| 5,148,885 | A | | 9/1992 | Weyer |
| 5,164,623 | A | | 11/1992 | Shkondin |
| 5,222,568 | A | * | 6/1993 | Higasa et al. ............... 180/234 |
| 5,368,141 | A | * | 11/1994 | Clarke ......................... 188/284 |
| 5,418,437 | A | | 5/1995 | Couture et al. |
| 5,442,250 | A | | 8/1995 | Stridsberg |
| 5,472,059 | A | | 12/1995 | Schlosser et al. |
| 5,540,296 | A | | 7/1996 | Strothmann |
| 5,542,492 | A | | 8/1996 | Kasper |
| 5,547,038 | A | | 8/1996 | Madwed |
| 5,633,544 | A | | 5/1997 | Toida et al. |
| 5,685,798 | A | | 11/1997 | Lutz et al. |
| 5,691,584 | A | | 11/1997 | Toida et al. |
| 5,698,912 | A | | 12/1997 | Rasch et al. |
| 5,793,132 | A | | 8/1998 | Hirose |
| 5,975,541 | A | * | 11/1999 | Harara et al. .......... 280/124.135 |
| 6,007,072 | A | * | 12/1999 | Yoon ......................... 280/5.514 |
| 6,286,616 | B1 | | 9/2001 | Kutter |
| 6,328,123 | B1 | | 12/2001 | Niemann et al. |
| 6,688,412 | B2 | | 2/2004 | Kima et al. |
| 6,836,036 | B2 | | 12/2004 | Dube |

FOREIGN PATENT DOCUMENTS

| DE | 198 60 562 A | 6/2000 |
| EP | 0 291 087 A | 11/1988 |

(Continued)

*Primary Examiner*—Hau Phan
(74) *Attorney, Agent, or Firm*—Morgan, Lewis & Bockius LLP

(57) ABSTRACT

A wheel provided with an electro motor in the wheel. A wheel strut is attached to a vehicle, and a wheel is attached to the wheel strut. The electro motor causes a wheel attachment component to rotate about its longitudinal axis. Data from the wheel is exchanged with other similar wheels.

5 Claims, 6 Drawing Sheets

FOREIGN PATENT DOCUMENTS

| | | |
|---|---|---|
| FR | 1 522 417 A | 7/1968 |
| JP | 60 209329 A | 10/1985 |
| WO | WO 95/16300 A | 6/1995 |
| WO | WO 98/19875 | 5/1998 |
| WO | WO 00/37304 | 6/2000 |
| WO | WO 01/53141 A | 7/2001 |

* cited by examiner

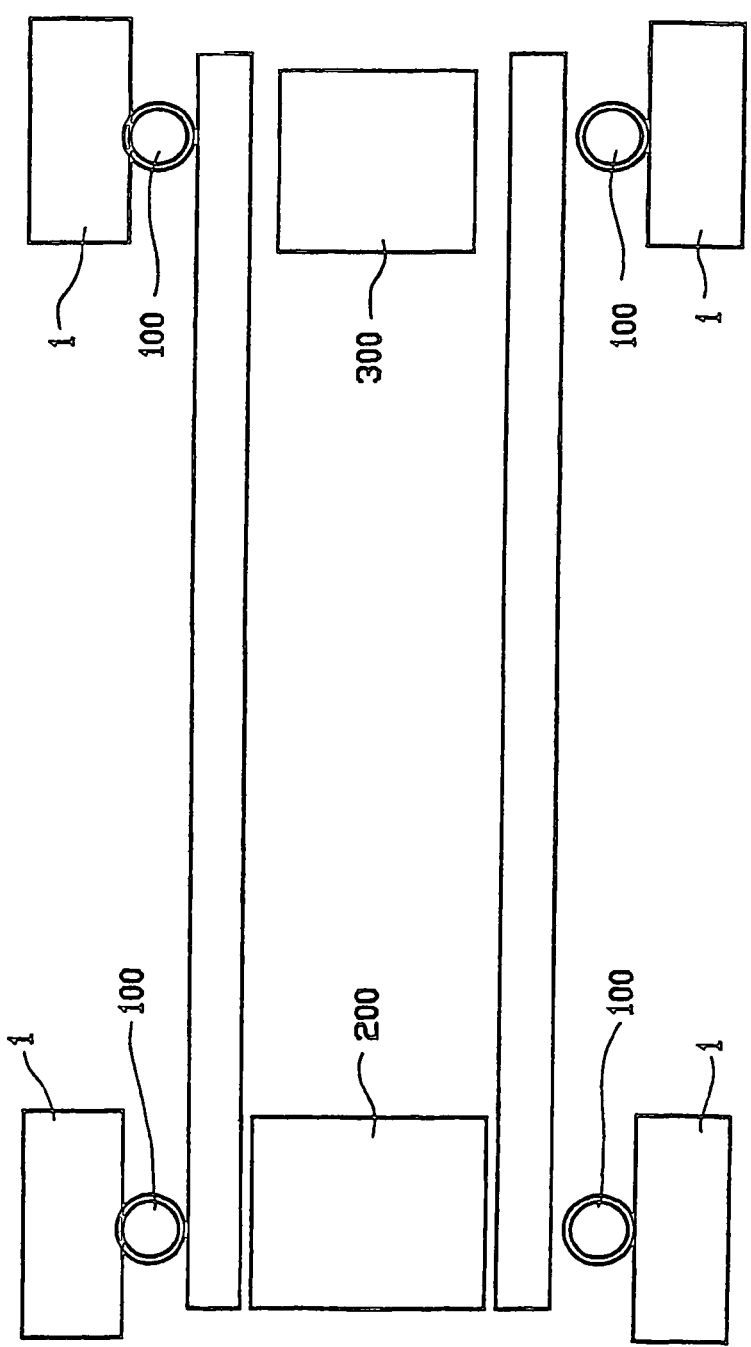
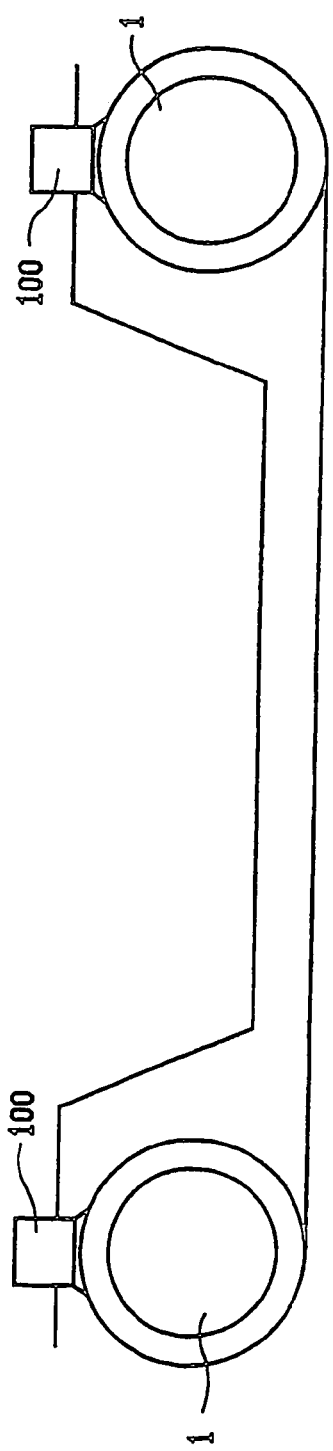

WHEEL PROVIDED WITH DRIVING MEANS

The invention relates to a wheel provided with electric driving means in the wheel as well as a method for coordinating the number of revolutions of at least two of such wheels attached to one vehicle.

From the literature wheels provided with electric driving means in the wheel are known. In particular wheels are known that are provided with electro motors in the wheel. Examples of such wheels can for instance be found in DE-A-2719736, DE-A-4404889, FR-A-2561593, U.S. Pat. No. 4,585,085 and WO-A-95/16300.

One of the problems occurring in the known wheels is the coordination between wheels when more than one driven wheel is used in one vehicle.

Another problem occurring in the known wheels provided with driving means is that control means are necessary. Such control means are arranged outside the wheel in a vehicle. This renders the building of an electronically driven vehicle a complex megatronic venture. WO-A-95/16300 tries to solve this by arranging a part of the control electronics within the wheel. Using several such driven wheels in one vehicle is not possible however.

It is an object of the invention to provide an electrically driven wheel of high efficiency.

An additional object of the invention is to provide a wheel that is easy to mount.

Additionally it is an object to develop a wheel that offers freedom of design of a vehicle.

Another object is a wheel that is simple to replace and to demount.

Another object is offering a wheel provided with driving means which in cooperation with other similar wheels can be deployed in one vehicle.

Said problems are at least partially solved and at least a part of the advantages is achieved by means of the wheel according to the invention.

To that end the invention relates to a wheel provided with electric driving means in the wheel, control, measuring and operating means in the wheel for operating the electric driving means and data communication means in the wheel.

Additionally the invention relates to a method for coordinating the number of revolutions of at least two wheel provided with electro motors in the wheels an further provided with control, measuring and operating means in the wheel for operating the electric driving means and with data communication means in the wheel, in which physically separated control systems control the amperage in each winding of the electro motors, the control systems in one wheel are operated by an operating system, a measuring system supplies information regarding the magnetic field strength to the control system and supplies the mutual position of the rotor and stator to the operating system, and the operating systems of the several wheels communicate one to the other by means of data communication means via a central processing unit.

Because of the wheel according to the invention a driving concept has been realised that is efficient, simple to mount and can be integrated in a vehicle.

Because of the method according to the invention it is possible to use several wheels provided with electric drive in one vehicle.

Preferably the wheel comprises a rim which coaxially at the inner side is provided with a rotor provided with permanent magnets and which rotor and rim are connected to a central shaft, and a coaxial stator provided with windings which stator is situated between the central shaft and the rotor and being connectable to a vehicle. In that way the wheel is provided with an electro motor. As a result a simple drive of the wheel is possible. Moreover no transmission is needed, particularly no reducing transmission, in which great power losses have appeared to occur.

More specifically the stator is divided into at least two groups of electrically and physically separated windings and each group comprises at least two windings each having its own control and measuring system, which control and measuring systems are situated in the wheel and the control and measuring systems are operated by an operating system which is also situated in the wheel. As a result a driving system is created that is integrated in a wheel, in which the driving system is very robust and not very sensitive to malfunctioning.

The wheel according to the invention more preferably comprises means for exchanging data with the control, measuring and operating system of other, similar wheels. As a result it is possible to couple several wheels according to the invention to one vehicle, because of which a powerful propulsion of the vehicle can be realised. In order to make the data communication less sensitive to malfunctioning, the means for exchanging data to the outside preferably are optical communication means.

In order to let either several wheels or one wheel according to the invention communicate with amongst others equipment outside of the wheel, the measuring, control and operating systems of a wheel communicate via a central processing unit outside the wheel. In this way for instance several wheels of one vehicle are able to communicate one to the other.

In order to further reduce the sensitivity to malfunctioning of a wheel even more, the control system comprises means for controlling the strength of electric current through each winding separately. In this case a winding also means a coil. When a current runs through the coil or winding this results in a magnetic field.

The control systems of the windings are connected to the operating system. Said operating system is hierarchically above the control systems and orders each control system to set and maintain a certain strength of electric current.

The wheel according to the invention is also provided with measuring systems, in which the measuring systems comprise an encoder for measuring the number of revolutions and the angular position of the rotor with respect to the stator, and a current measuring device for measuring the current through each of the windings. As a result the current through each winding can be accurately set and calibrated. Additionally the operating system is able to operate the winding well, and set the phase on each winding for an optimal working of the electric drive. Additionally the measuring system is provided with means for measuring the mechanic torque, preferably by means of strain gauges that are able to measure the strain in material accurate to the nanometre. Such means for measuring strain or torsion, deformation in metal in general, as such are known to the expert. Comparison of mechanic resulting torque and accommodated motor power give an idea of the condition of the wheel.

For a good working, the encoder preferably is connected to the operating system and the control systems are connected to the current measuring devices. As a result a modular system is created that is not very prone to malfunctioning.

The operating system is connected to a central processing unit outside the wheel by means of the data communication means. As a result the coordination with other systems in a vehicle is possible.

In order to cool the driving means in case of an all to great development of heat, the wheel is provided with cooling means, and of so desired also with active cooling means, such as fans. Additionally the wheel may be provided with means for water cooling.

In order to render cooperation of several wheels according to the invention in one vehicle possible, the operating systems in the wheel preferably are provided with a "master" setting and a "slave" setting, in which by means of the communication means the central processing unit is able to have the operating system switch from the "master" setting to the "slave" setting and vice versa. For instance when taking bends either the power demand or the speed of several wheels will vary. In order to make coordination one to the other possible, the switch from the "master" setting to the "slave" setting and vice versa is influenced by either the power demand or the speed of the wheel. It is preferred here that the wheel demanding the lowest power, i.e. the wheel having the highest speed of revolution, has been set as "master".

In the method according to the invention it is preferred that the central Processing unit has the operating system of the wheel demanding the lowest power function as "master", and has the operating systems of the other wheel or other wheels, respectively, operate as so-called "slave", in which each time the operating system of the wheel demanding the lowest power acts as "master" and the operating systems of the other wheels act as "slave". As a result the driving system is easy to implement and control.

In order to anticipate future situations during driving well, it is preferred that the central processing unit includes data of the wheel struts regarding the angular position when managing the operating systems of the wheels.

The invention further relates to an assembly of at least two wheels according to the invention that are connected to a common central data processing unit by means of data communication means.

The invention further relates to a vehicle wheel having an electro motor in it, in which the electro motor is a more than 8 pole, 3 or more phased, DC synchronous motor.

Additionally the invention relates to a wheel provided with a housing mounted at a rotatable shaft, at the outside provided with a rim with tyre and at the inside provided with permanent magnets, and a housing mountable at a vehicle, rotatably connected to the shaft, provided with control, measuring and operating means and electric means for generating a magnetic field. Because of such a structure the wheel is simple to replace and can be mounted in a modular manner. Additionally a mechanic brake system is easy to mount on the shaft as an extra safety provision.

Additionally the invention relates to a wheel provided with electric driving means in the wheel, means for measuring the mechanically delivered torque, means for measuring the torque by measuring the electrically accommodated power and means for comparing the mechanically delivered torque and the measuring to the electric power. As a result it has appeared possible to establish premature wear and malfunctions in the wheel, even before an actual defect occurs. By means of the communication means a (future) defect can be established even at a distance and possibly be remedied.

Additionally the invention relates to a wheel provided with electric driving means in the wheel, provided with at least two galvanically separated motor windings, at least two galvanically separated power modules and at least two galvanically separated operating units for the power modules.

The invention moreover relates to a wheel strut provided with vehicle attachment means for attaching the wheel strut to a vehicle, and wheel attachment means for attaching a wheel to the wheel strut, in which the wheel attachment means are rotatable about the longitudinal axis with respect to the vehicle attachment means and in which the wheel strut is provided with driving means for rotating the wheel attachment means with respect to the vehicle attachment means.

As a result such a wheel strut is easy to mount on a vehicle, and the other means such a steering means for the vehicle and drive for wheels can easily be coupled.

Preferably the vehicle attachment means and the wheel attachment means are spring-mounted to each other along the longitudinal axis by means of connection means.

Preferably the connection means comprise a splined shaft which at one side is provided with a spline and on the other side is provided with driving means for rotating the splined shaft, and with a spline housing in which the splined shaft is situated and which spline housing at the bottom side is provided with accommodation means for a wheel shaft and attachment means for a wheel, and in which the vehicle attachment means are formed by a sleeve provided with means to connect the sleeve to a vehicle, in which the spline housing with splined shaft is at least partially accommodated in the sleeve, in which the spline housing and the sleeve are spring-mounted to each other by means of spring means, and the driving means are connected to the sleeve.

The structure that can be realised in this way is simple, robust, and can be integrated well in and with existing vehicles and production methods.

In order to attach a wheel the spline housing is provided with a receiving sleeve for a shaft which is positioned substantially perpendicular to the spline housing. As a result it is possible to attach a wheel stably and securely.

Additionally the wheel strut comprises spring means for buffing the vertical movement of the wheel attachment means with respect to the vehicle attachment means.

Preferably the wheel strut is provided with means for communicating with the driving means.

Preferably the wheel strut is provided with means for communication with the operating means of a wheel according to the above-mentioned first aspect of the invention. Preferably the driving means of the wheel strut communicate with the operating means of a wheel according to the invention by means of the central processing unit.

Said aspects of the invention can, if so desired, be combined. For instance a vehicle can be equipped with 2 or 4 wheel struts according to one aspect of the invention, and 4 or more wheels according to the invention. It is also possible for instance that a fork-lift truck is equipped with only one or two wheels according to the invention, but also with two wheel struts according to the invention.

As a result of a high degree of automation the wheel strut and the wheel according to the invention are particularly suitable for use in fully automatically guided vehicles. Operation can also take place by means of a joystick and so-called drive-by-wire, in which the signals of for instance a joystick or steering wheel are converted into (electric or optic) steering signals.

The invention additionally relates to a computer provided with software for the operation of one or several wheels as described, and/or for the operation of the wheel strut. Additionally the invention relates to a data carrier provided with such software.

A number of specific embodiments of the invention will be elucidated on the basis of the figures. The figures serve to illustrate the invention. The invention, however, is not limited to the specific embodiments shown.

FIG. 5A shows a top view of a vehicle having wheels and wheel struts according to the invention.

FIG. 5B shows a top view of the vehicle of FIG. 5A.

Figure 1:
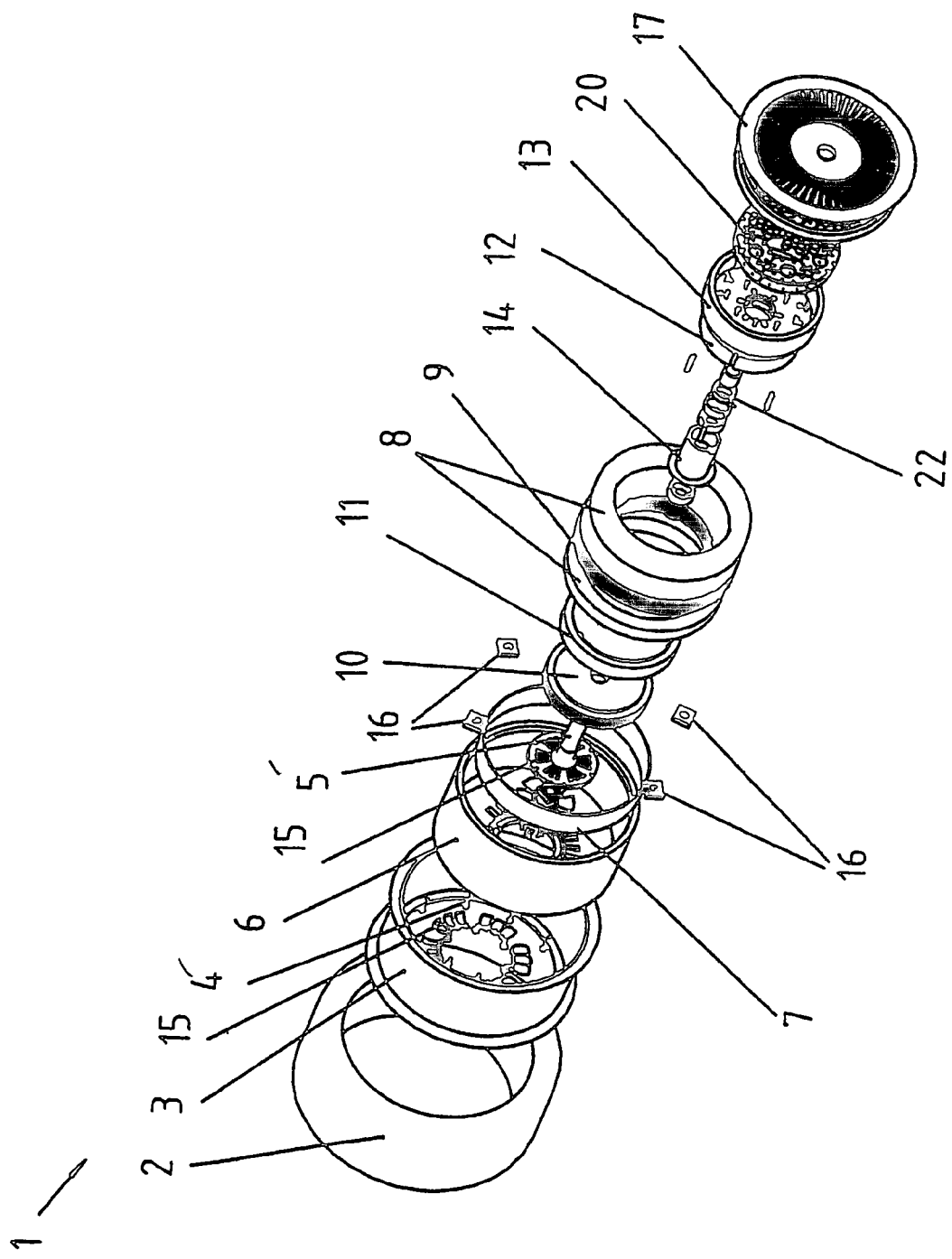
FIG. 1 shows a wheel according to the invention.

FIG. 1 shows the wheel 1 according to the invention. In the figure the wheel is provided with a tyre 2, which can be used in several embodiments. The tyre may for instance be a full rubber tyre for use in low speed vehicles such as tractors, fork lift trucks or other types of vehicles for cargo transport. The wheel diameter will preferably be approximately 800 mm. The tyre may also be designed as air pressure type for use in medium speed vehicles such as for instance city taxis and medium heavy cargo transport in urban areas.

The tyre 2 is mounted on rim 3, which is adapted to the various types of tires. A lid 4 has been mounted to the rim 3, which connects the rim to the central shaft 5.

At the inside of the rim 3 the rotor 6 is attached on which at the inside the permanent magnets 7 have been glued. Said permanent magnets 5 rotate along with the rim 2. The rim 3 with the tyre 2, the rotor 6 with the permanent magnets on it and the other parts attached to the rim, the lid 4 and the central shaft 5 are the rotating parts of the wheel.

Within the permanent magnets 7 an iron package 8 with windings 9 has been accommodated, with an air gap between the iron package 8 with the windings and the permanent magnets 7.

The iron package 8 with the windings 9 is mounted on the central carrier member 11 and mounted on cover plate 17 by means of clamping members 10 and 13. Said cover plate 17 has been provided with a mounting flange (not shown, preferably a B5 flange of the 250 mm type) with which the wheel 1 is mounted to a vehicle. In the clamping member 13 which is provided with an accommodation space, the control electronics 20, amongst others consisting of IGBT's for current control and programmable logical modules for the operating system, have been accommodated. The iron package 8, the windings 9, the clamping members, and the electronics are fixedly attached to a vehicle by means of said flange and therefore are not a rotating part.

The central shaft 5 is provided with a hard metal mounting bush 14 on which the bearings 23 of the wheel run. About the central shaft 5 the encoders 21 have also been mounted for measuring in what position the rotor 6 is situated with regard to the windings 9. As a result the operating and control electronics 20 are able to control the exact phase of the voltage on each winding 9 at any moment, so that said phases are optimally adjusted to the position of the permanent magnets 7 with regard to each of the windings 9.

In the figure lid 4 is provided with blades 15 and 15'. One ring of the blades 15 has been mounted directly about the central shaft, a second ring of blades 15' concentrically about the first ring of blades 15. The blades 15' are open towards the most general direction of rotation (clock-wise as seen from the vehicle side) of the wheel 1. Said blades serve to guide air into the motor for cooling. The blades 15 about the central shaft with the air inlet openings are mounted opposite to the blades 15'. When driving the vehicle, to which the wheel 1 has been mounted, the blades 15 will guide air into the wheel 1, and blades 15' suck air out of the wheel. As a result an air flow to the inside will be created, which flows over a cooling body on the outer clamping member 10.

The blades function according to the principle of the centrifugal pump. The number of blades 15 about the central shaft is smaller than the number of blades 15' in order to give the air expanded through heating more space and to be able to discharge it more easily.

In addition to the passive cooling by means of the blades, fans for active cooling may be present in the wheel 1. Said fans may for instance be activated when the internal temperature exceeds a certain value.

The various internal parts of the wheel may, because of the nature of the structure according to the invention, be sealed off liquid proof in a simple manner. As a result it is possible that in addition to the passive cooling by means of blades and the active cooling by means of the fans, the inside of the wheel is cooled by means of liquid cooling. The cover plate 17 in any case seals off the operating and control electronics 20 from the outside world.

The rotor 6 can be made of aluminium and of steel, depending on the speed and bearing power needed.

The rotor 6 is carrier of the permanent magnets 7, which ensure the torque transmission. They also ensure the guidance of the flux, which is necessary to have the magnets act as effectively as possible and thus creating a magnetic connection with the magnetic field which is generated in the stator. The stator is formed by the iron package 8 with windings 9.

Apart from the air cooling in the motor, heat can also be discharged by means of cooling ribs 24. In the production stage they are integrated in a casting with the cover plate 17.

For the internal cooling of the electronics 20 a cooling body is provided. Said cooling body of course serves to cool the electronics but also has two additional functions, namely fixation of the stator and sealing off of the water cooling which can be used in larger power and higher voltages. In the figure the cooling body is still separated from the clamping member, but in series production this can become one structure part.

Clamping member 10 together with the clamping member 13 of the electronics 20 ensures that the iron package 8 of the stator gets clamped and thus cannot possibly slide in axial direction with respect to the rotor 6. As a result the magnets 7 remain exactly in their places with respect to the rotor 6 for optimal efficiency.

The stator with windings 9 in FIG. 1 consists of 3 parts, but preferably the iron package of the stator will be made of one part. The windings 9 have been arranged around winding heads, which windings are wound according to a fixed pattern so that an optimal driving behaviour of the wheel 1 according to the invention is achieved. Electric currents run through the windings 9, which currents generate the magnetic forces that are needed to let the rotor 6 rotate. The iron package 8 ensures an optimal guidance of the flux. A well-chosen iron package 8 guarantees a high efficiency of the wheel according to the invention.

A sealing ring ensures the separation between the internal part of the air cooling and that part where the bearing of the wheel according to the invention and the electronics is housed.

Furthermore a mounting bush 14 has been arranged as a support for the bearing. (2 double-row angle contact bearings). Said mounting bush 14 has been designed in a high quality type of steel. The steel mounting bush 14 transfers the forces from the bearings on the central carrying member 11 and prevents the rolling out of the central carrying member 11 by the bearings. The bearings ensure the absorption of both the axial and radial forces and namely equally, so that during bends and irregularities in the road surface a stable rotation of the rotor 6 is obtained. Said stable rotation is very important because for an efficient working of the wheel according to the invention an air gap of approximately 2 mm at a maximum preferably is present between the rotor 6 and the stator. The bearings are after all over-dimensioned in order to ensure said air gap during a large number of operation hours (10,000 hours at a minimum).

Splines have been arranged between the stator and the central carrying member 11 so that said two members cannot possibly rotate with respect to each other.

A retaining ring is pressed by the cover plate 17 and in this way locks the bearings, which in their turn fixate the stator with respect to the shaft. In this way it is guaranteed that rotor 6 and stator remain in the same position with respect to each other.

A retaining sleeve keeps the hollow shaft encoder in its place and also ensures that the inner ring of the bearings is confined. The retaining sleeve in its turn is fixated on the central shaft 5 by a nut and screw thread.

The central carrying member 11 supports the stator and is blocked against rotation there by means of 3 spline connections which are divided over the circumference in a regular pattern. In the carrying member 11 recesses have been arranged in the surface as a result of which during mounting openings are created through which cooling liquid can be transported. Said cooling may be necessary for higher voltages than 96V and larger capacities than 12 kW.

The clamping member 13 has a number of functions.

A: Together with clamping member 10 it clamps the central carrying member 11 and the iron package 8, as a result of which the stator is entirely confined.

B: It closes off the recesses that are meant to let the cooling liquid pass through.

C: It forms an accommodation space or bowl in which the electronics are housed.

Said accommodation space in its turn is closed off by the cover plate 17. As a result the electronics 20 are completely sealed off from the outside air, which guarantees a failure free working of the wheel according to the invention.

The ring bearing ensures additional support of the rotor 6, so that the air gap is guaranteed at all times.

During mounting, the cover plate 17 ensures correct connection, sealing, and confinement of the entire structure. This is also the attachment plate for the mounting of the wheel according to the invention to a vehicle or a chassis and preferably is provided with a norm flange B5 of the 250 mm type, as a result of which the wheel can simply be fit in the existing concepts. By means of the cooling ribs 24 extra heat is discharged during driving.

The permanent magnets 7 are manufactured in such a shape that they precisely fit into the rotor 6. After gluing at the inside of the rim of the wheel the magnets form one unity together with the rotor. The magnets preferably are rare earth magnets. Preferably the permanent magnets have a magnetic field strength larger than approximately 1 Tesla.

The encoder for hollow shaft 21 ensures that the way covered can be measured, and also drives the electronics 20, so that a computer or central processing unit knows in which position the rotor 6 is situated with respect to the stator. This is of utmost importance for a shock free rotation of the rotor.

The electronics and logic for operating the wheel, as well as the power electronics has been arranged within the wheel according to the invention. As a result it has become possible to achieve a number of advantages.

One of the largest problems encountered at the moment by manufacturers of electronically driven vehicles, is that all sorts of components are spread over the vehicle that later on have to be connected to each other again. As a result the manufacturing of electronic vehicles is a time-consuming activity and therefore costly as well. Additionally the production often takes place in three consecutive stages as a result of which the production time is relatively long.

Figure 2:
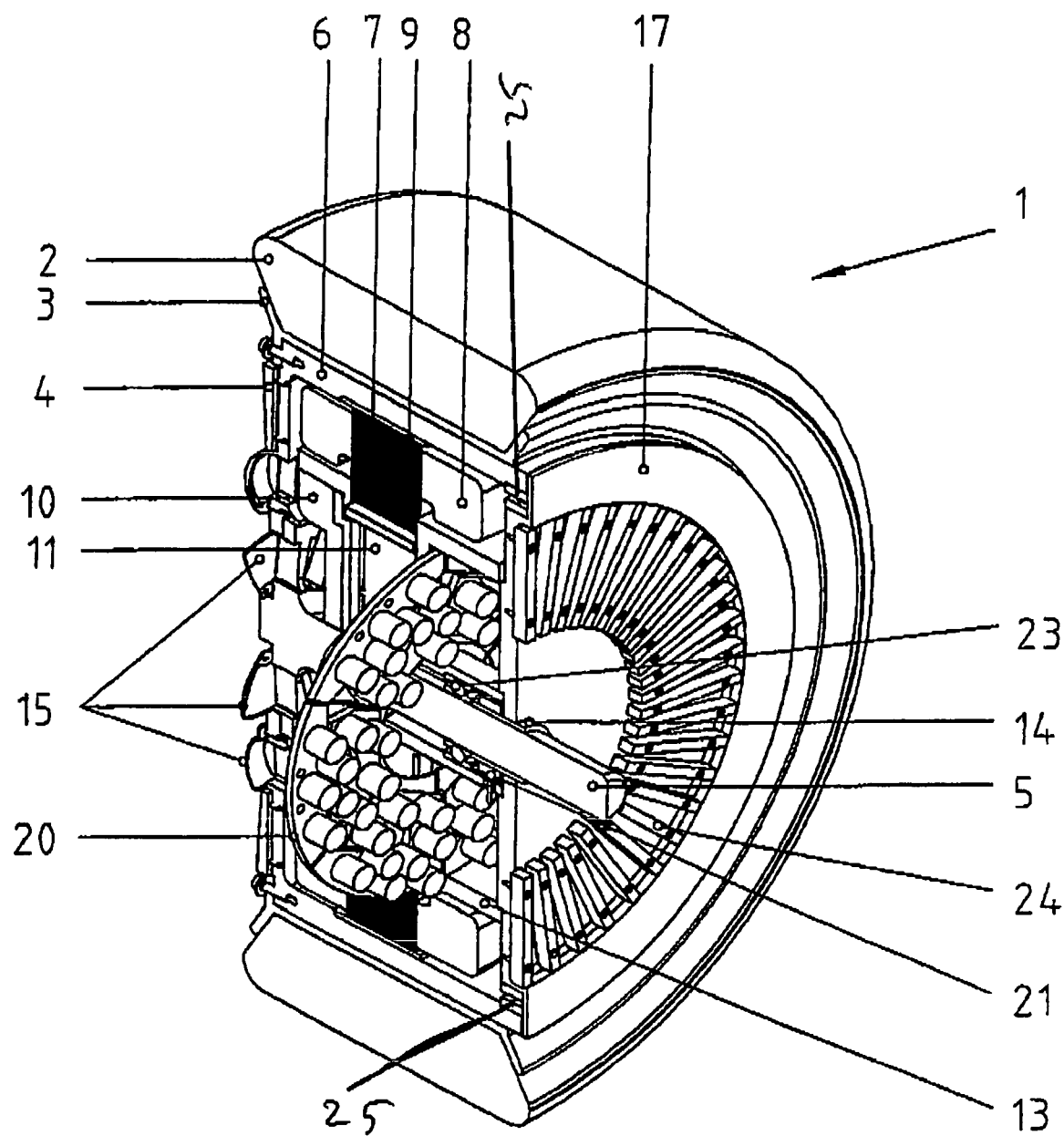
FIG. 2 shows the wheel of FIG. 1 in cross-section.

FIG. 2 shows the wheel according to FIG. 1 in cross-section, as a result of which special aspects of the embodiment of a wheel according to the invention shown in FIG. 1 are further elucidated. The reference numbers here have the same meaning as in FIG. 1. In the cross-section it can clearly be seen how the rim 2, rotor 6, permanent magnets 7 and the central shaft 5 are connected to each other by means of lid 4. Furthermore it can clearly be seen how the windings 9 and the iron package 8 (the stator), and the clamping members 10, 13 with the electronics 20 are connected to the cover plate 17. In the cross-section it can clearly be seen as a result, how the electric driving means, in this case the electro motor, are situated in the wheel 1. By placing an electro motor in such a way it has appeared possible to achieve very high efficiency, up to 50% higher than in the usual electrically driven vehicles. In particular an electro motor as described in the FIGS. 1 and 2 results in a great advantage. For instance, the motor having permanent magnets is capable of generating electricity itself when in neutral, because the motor acts as a dynamo. Because of the mounting of the motor in the wheel it is not necessary any more either to use a transmission or a differential. The number of revolutions of the motor need not be high either.

Figure 3:
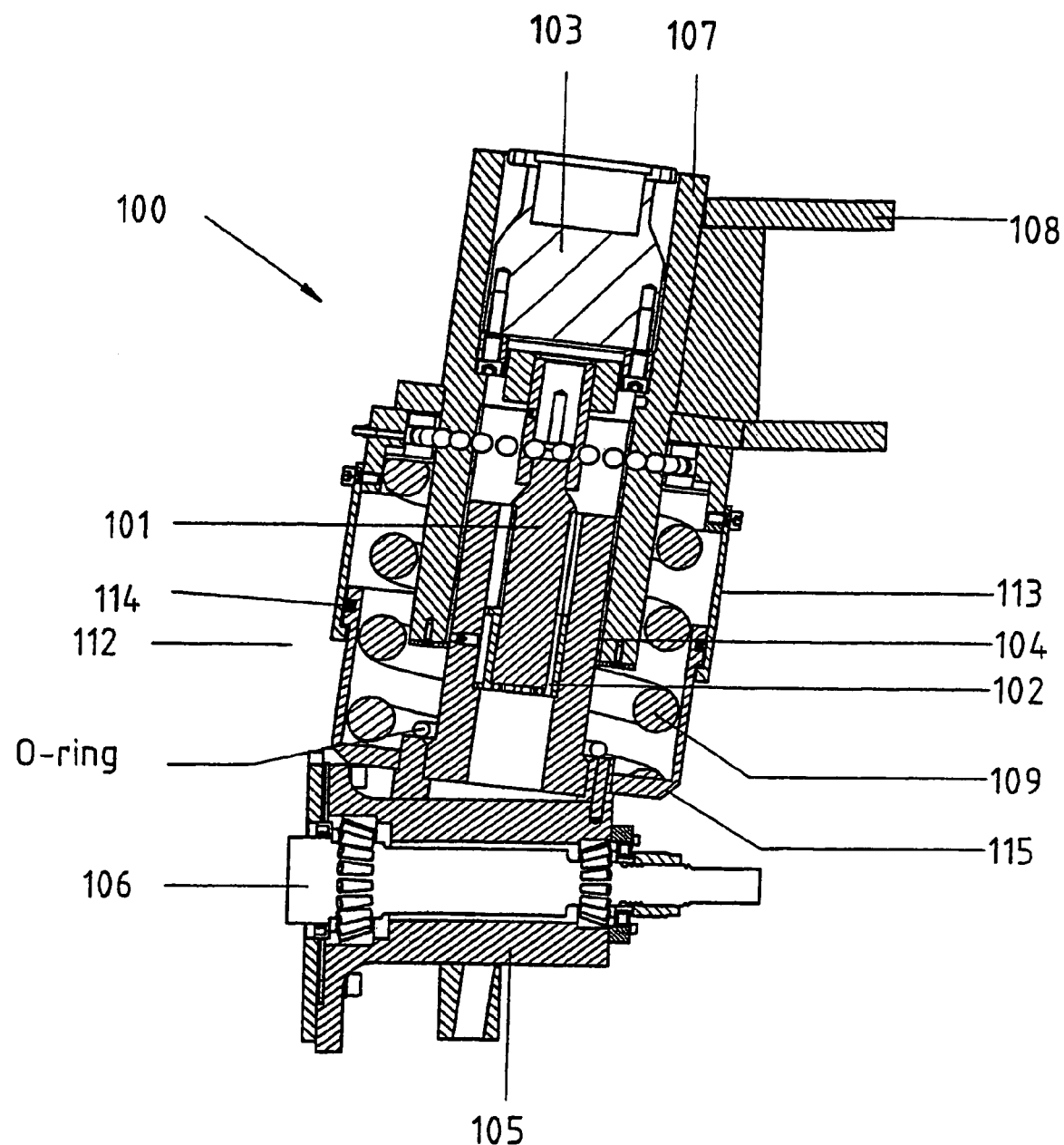
FIG. 3 shows a cross-section of a wheel strut according to another aspect of the invention.

FIG. 3 shows the wheel strut which is another aspect of the invention. The wheel stock 100 comprises a splined shaft 101, at the one side provided with a spline 102 and at the other side provided with driving means 103 for rotating the splined shaft 101. The driving means preferably consist of an electro motor 103. The splined shaft 101 is rotatably situated in a spline housing 104. At the bottom side said spline housing 104 is provided with accommodation means 105 for a wheel shaft 106. The spline housing 104 is at least partially accommodated in a sleeve 107 provided with attachment means 108 for mounting the wheel strut 101 to a vehicle. The spline housing 104 and the sleeve 107 are spring-mounted to each other by means of a spring 109. The housing of the electro motor 103 is connected to the sleeve 107. The spline housing is provided with a shaft receiving sleeve 105 for a shaft which is positioned substantially perpendicular to the spline housing. The shaft receiving sleeve 105 is fixedly attached to the spline housing 104.

The spring 109 is meant to buff the movement of the part spline shaft-sleeve with respect to the part spline housing-shaft receiving sleeve.

The sleeve 107 is provided with attachment means 108 for attaching the wheel strut 100 to a vehicle. The attachment means 108 are formed by a support 108 which is a permanent part of the structure and which is attached to the chassis or the structure with 2 conical pins and in that way forms one unity with the chassis or the structure of the vehicle.

In order to protect the spring 109 from outside influences it is enveloped by a distance sleeve 112 which at its upper side is attached to sleeve 107. Said distance sleeve 112 consists of two parts and is provided with small air outlet openings which buff the springy action of the suspension like a shock absorber. They also serve as end stop in case the vehicle is lifted with its wheels from the ground. The lower part of the distance sleeve 115 is slid into the upper part 113. The distance sleeve members 115 and 113 are closed off one to the other with the help of a quadring 114.

In order to rotate a wheel electro motor 103 is activated. The rotation of the electro motor 103 is transmitted to splined shaft 101. The rotation of the splined shaft is transmitted to spline housing 104, as a result of which the wheel receiving sleeve attached to it rotates and a steering movement can be made. The electro motor can be provided with a transmission. The wheel strut is also provided with control and operating means for the electro motor. Additionally the wheel strut is provided with a so-called encoder which record the angular position of the wheel attachment means with respect to the vehicle attachment means. The wheel strut is also internally provided with data communication means, preferably optical data communication means. The encoder supplies operation information to the operating means of the wheel strut. The splined shaft 101 can also move up and down in the spline housing, as a result of which springing becomes possible. The vehicle attachment means can as a result move along the longitudinal axis with respect to the wheel attachment means.

The spline housing 104 is the part of the wheel suspension that rotates and moves up and down. A wheel can be attached to the spline housing 104 by means of a B5 standard flange. A brake device can be also mounted to the rear side by means of the central shaft 12/106. The central shaft 12/106 can also be equipped with a flange on which a wheel in neutral can be attached whereas on the other side disc brakes can be mounted. When the wheel according to the invention is mounted this part can be left out.

The triangle support is a point of adhesion for a triangle. Said triangle is available on the market and makes it possible to increase the load of the spring leg from 1500 kg allowed load bearing capacity to 4000 kg allowed load bearing capacity. By using the triangle bending forces are no longer exerted on the suspension.

An extended central shaft of a wheel according to the invention is necessary for the mounting of a wheel and may also serve to mount discs of a brake system.

The spring ensures a comfortable road holding of the vehicle on which the wheel and the suspension have been mounted. In the 4 ton version with triangle the spring is indeed completely pressed in but ensures a minimal spring pressure of 1500 kg when the vehicle is positioned inclined and one of the wheels threatens to come off the ground.

The rubber O-ring ensures the buffering of the spline housing 104 in the unlikely event of the load becoming so high that the spline housing 104 bumps against the support.

Description of the Electronic Control for Operating the Synchronous Motor in the Wheel According to the Invention.

The electronic control for the wheel according to the invention is built up modularly from several elements. The several elements are hierarchically adjusted to each other. The following elements can be distinguished.

1. Power Modules

At the lowest step IGBT main current modules have been used. The structure present in said IGBT main current modules renders them highly reliable in themselves already and guarantees a low heat emission and an optimal efficiency. The main current modules control the current through the windings. The windings are divided into three groups, each having another phase. Per winding there are two main current modules. The main current modules are driven by a higher step, namely:

2. Current Regulators

At the second step 2 IGBT main current modules are connected to a current regulator and driven by the current regulator. Together with a separate current sensor working according to the Hall principle (Hall sensor) they form an independent end step that controls the current in the accompanying motor winding. In this step the module and the current regulator are already galvanically separated from the operating electronics. A current regulator having two main current modules and Hall sensor are further called 4Q-modules. The main current modules with current regulator form a control system. There is a control system per winding.

3. Vector Generator

The vector generator supplies an operating value to the so-called 4Q-modules (step 1 and 2), which thus generate a magnetic field vector by means of windings of the synchronous motor and thus determine the moment of torque.

A so-called encoder or resolver, a measuring apparatus that very accurately measures the angle or the number of revolutions, makes the present position of the rotor with respect to the stator known to the vector generator. The quick calculation of the rotor position, which is derived from the sine/cosine signals of the resolver and the feedback value connected to it, ensures an optimal setting of the field vectors of the motor together with programmable logic modules, the so-called FPGA's.

The entire function of the vector generator, due to the combination of a micro processor and the FPGA's, can be programmed entirely over an optical fibre cable. This means that new data or changes needed for a special use can immediately be implemented (by telephone or internet) in the wheel according to the invention that is already in operation. Said changes do not only regard the software of the FPGA's, but also the hardware of the modules. It is for instance possible to change the relation in the motor itself when a winding or a module should fail so that the wheel can remain functioning. The vector generator forms the operating system. The encoder and the Hall sensors with the accompanying electronics in the described embodiment form the measuring system.

4. CPU or Central Processing Unit

The first three stages are housed together in the wheel. The CPU is situated outside the wheel and communicates with the several wheels according to the invention that may be present on a car, by means of an optical ring data bus line (ORDABUL). It is also able to carry out calculations needed for the AGV's (automatic guided vehicles) regarding the road covered, odometrics when taking bends and diagnosing the complete driving concept. Each stage guards and reports the data important for the operational situation to the CPU. An error report is immediately reported to the stage above and this one immediately reacts by taking the necessary measures, before damage may arise. The stage above is able to activate an emergency program, which reacts to the error in the correct manner. As a result an error in one module hardly influences the entire vehicle.

The modular system makes it possible to make a simple error diagnosis and to quickly locate the relevant components without having to subsequently perform complex adjusting or setting activities.

An important difference with the usual control of Asynchronous/synchronous motors is the fact that in a preferred embodiment all motor windings are divided into three groups, each preferably consisting of 30 independent windings, electrically separated from each other and each winding being driven by its own 4Q-module. Here the 4Q-modules are merely connected to each other by means of the power supply voltage, as a result of which the following advantages arise:

1: Only two phases of the normal 3-phase drive are guarded and controlled. The currents in the third phase are calculated from the behaviour of the other two phases. This means a much greater freedom in operating the electronics, and for instance in buffering the failure of one or more modules.

2: The current distribution can be adjusted exactly so that each motor winding generates the same field strength. As a result the actual moments of torque in each winding, generated by the field, can be adjusted and are independent from the irregularities in the electric variables of the separate windings.

3: The magnetic tolerances of each winding can be calibrated separately by means of the vector generator.

4: When a 4Q-module fails or one of the windings has short circuited, the motor can still remain operational. A fuse or relay is able to separate the defect module or phase of the other 2 4Q-modules or phases without influencing them. In this way the motor is still able to brake or, when several wheels are used, to support them. The advantages of a stage-wise structure come to the fore here in particular.

Figure 4:
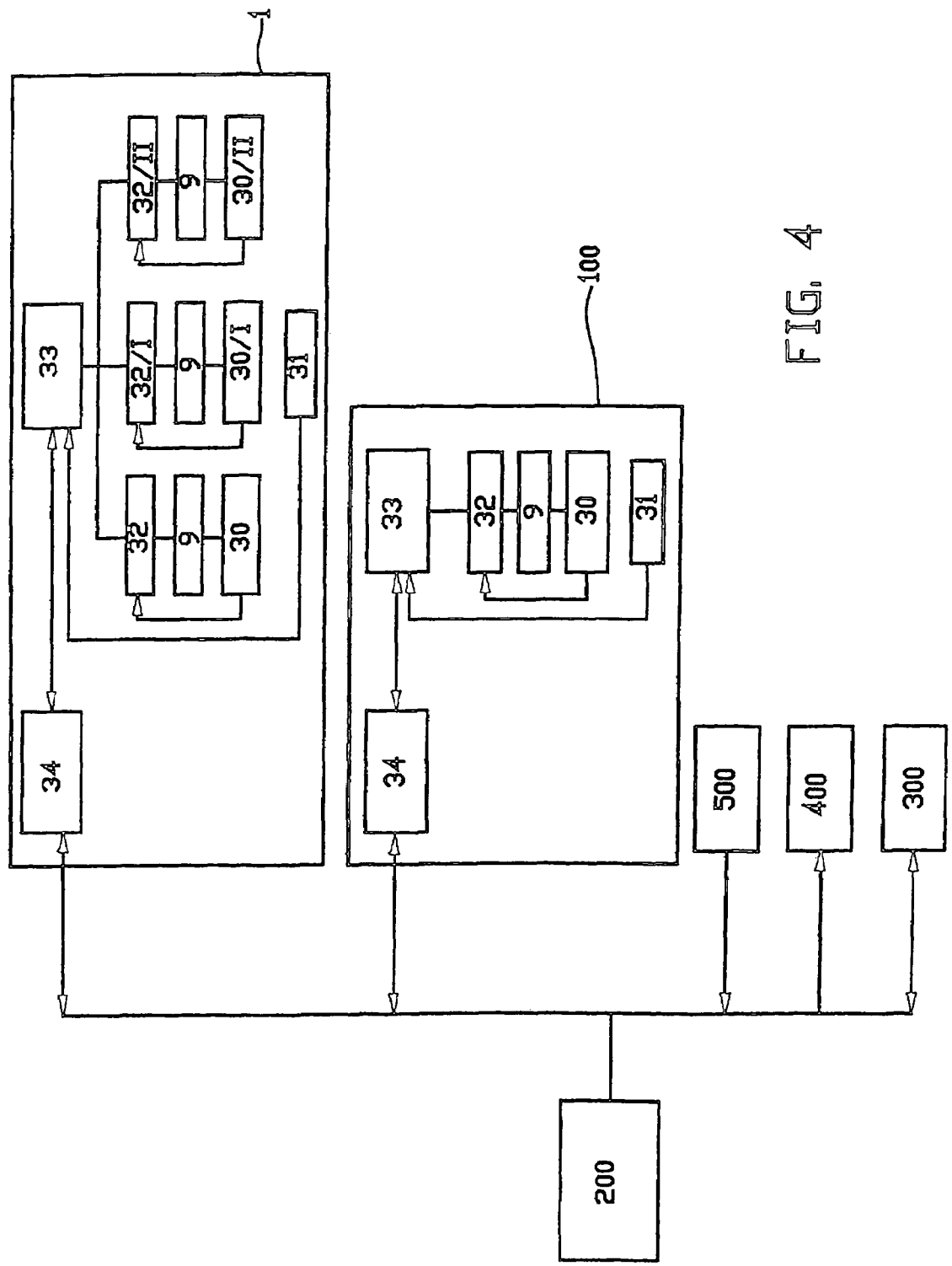
FIG. 4 shows a diagram of a control and operating system of a wheel according to the invention.

The functionality of the electronics described and their connection is further elucidated in FIG. 4. By means of a block diagram the connection is schematically shown here and the hierarchy of wheels, wheel struts and other control and operating means in an electrically driven vehicle, such as for instance a remote or automatically controlled vehicle. A central processing unit or computer 200 controls the overall exchange of data between the several parts, and ensures the possible automatic control of the vehicle. The computer 200 is connected to energy management system 300, namely the batteries, possible generators, fuel cells or solar panels, by means of data communication lines, for instance optical data communication lines. Additionally the computer 200 is connected to a display screen 400 on which the data are presented regarding the status of the various systems. The central computer 200 is also connected to various sensors that supply information regarding the vehicle position, possible obstacles, inside climate, and the like. The central computer moreover is connected to for instance two or more wheel struts 100 according to the invention. The numbers in the figure here correspond to the parts already described.

The central computer 200 is moreover connected to at least one or more wheels 1 according to the invention. It can be seen that the wheel comprises three groups of windings 9, 9/1 and 9/11, control systems 32, 32/1 and 32/11 for each group, and measuring systems 30, 30/1 and 30/11 for each group. Additionally the wheel comprises the already described encoder 31, which supplies data regarding the relative position of the rotor with respect of the stator to the operating system 33 superior to it. In the figure the three groups of the preferably in total at least 30 windings 9, 9/1 and 9/11 in a wheel 1 according to the invention are shown. The windings 9 are preferably divided into three groups, each having another phase $\phi^1$, $\phi^2$ and $\phi^3$. The current through each group of windings 9, 9/1 and 9/11 is measured by a Hall sensor 30. The value measured is passed on to the control system 32. The control system 32 controls the current through a group of windings by means of 2 IGBT's. The control systems 32 are operated by an operating system 33. Said operating system also receives data from an encoder 31, which supplies angle information about the rotor with respect to the stator. As a result the operating system 33 is capable of choosing a good phase setting for an optimized working. The operating system 33 is coupled to a central processing unit 200 in a vehicle by means of data communication means 34, preferably suitable for optical data communication.

FIG. 5A shows a top view of a vehicle provided with four wheels 1 according to the invention. Said wheels 1 are each attached to a wheel strut 100 according to another aspect of the invention that has also been described. Said wheel struts are each provided with means in the wheel strut as a result of which each wheel is able to rotate and in which way it is possible to drive the vehicle. The vehicle is furthermore equipped with a central processing unit 200 and batteries and control systems 300 for them. In FIG. 5B a side view of the vehicle of FIG. 5A is shown.

Figure 6:
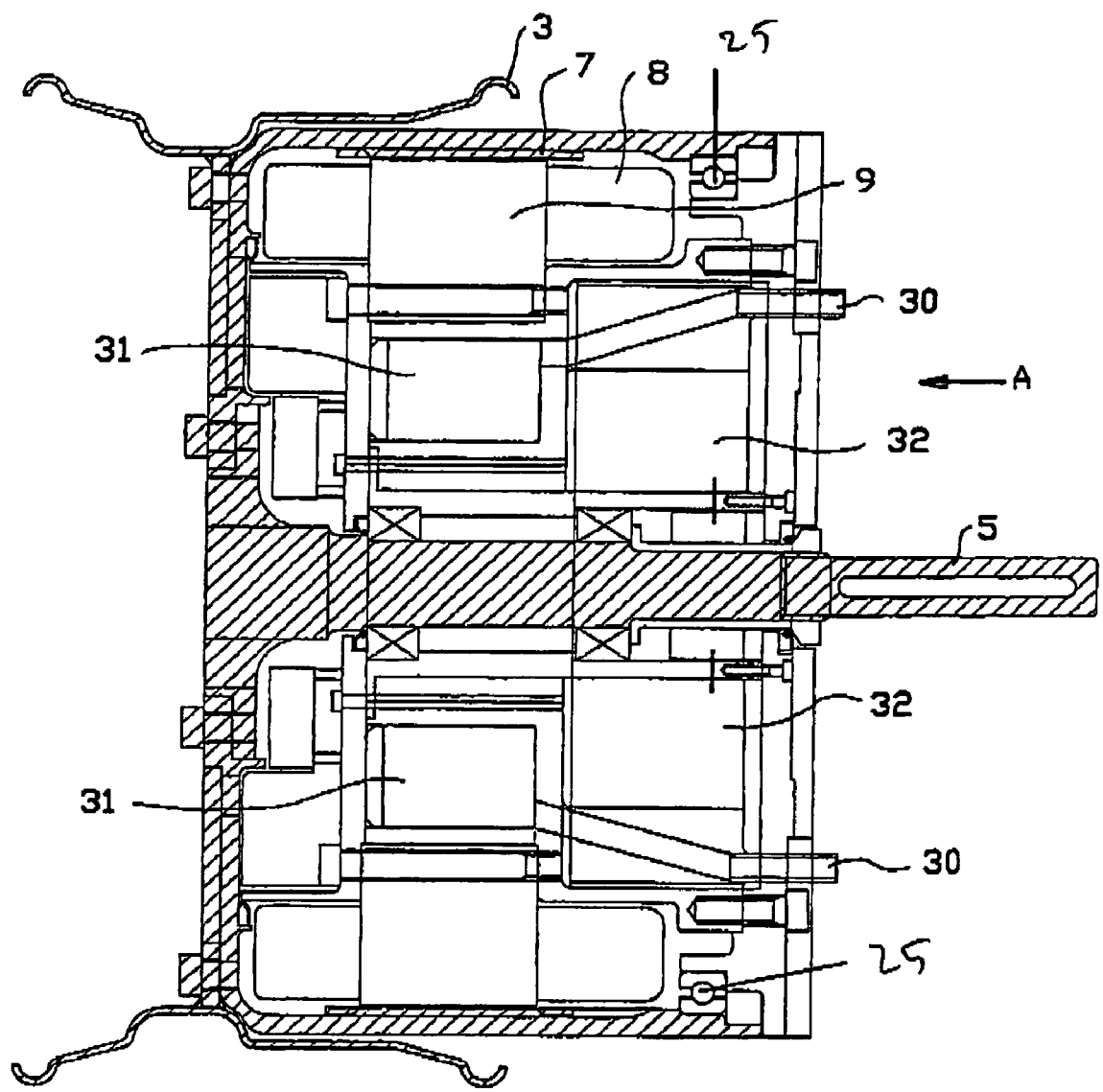
FIG. 6 shows an alternative embodiment of the wheel according to the invention.

FIG. 6 shows an alternative embodiment of the wheel according to the invention. The reference numbers correspond as much as possible to those in FIGS. 1 and 2. The vehicle side is shown with arrow A. The wheel according to FIG. 6 is provided with for instance water cooling. The inlet and outlet, respectively, of the cooling liquid is indicated by number 30. The inlet and outlet 30 debouch in a space 31 around the shaft through which cooling liquid circulates. In this embodiment the measuring, control and operating means have been arranged in space 32. The electronics are arranged with the print plates oriented towards a vehicle. The cooling liquid, preferably water, mainly serves to cool the windings.

What is claimed is:

1. A wheel strut comprising: vehicle attachment means for attaching the wheel strut to a vehicle, wheel attachment means for attaching a wheel to the wheel strut, wherein the wheel attachment means are rotatable about a longitudinal axis of the wheel strut and with respect to the vehicle attachment means, and wherein the wheel attachment means are moveable up and down along the longitudinal axis with respect to the vehicle attachment means; driving means comprising an electro motor for rotating the wheel attachment means about the longitudinal axis of the wheel strut and with respect to the vehicle attachment means; operating means for operating the electro motor, and communication means connected to the operating means, wherein the communication means are adapted for exchanging data with control means and operating means of other similar wheel struts.

2. A wheel strut according to claim 1, in which the vehicle attachment means and the wheel attachment means are mounted to each other along the longitudinal axis by means of a suspension assembly.

3. A wheel strut according to claim 2, in which the suspension assembly comprises a splined shaft which at one side is provided with a spline and on the other side is provided with the driving means for rotating the splined shaft, and with a spline housing in which the splined shaft is situated and which the spline housing at the bottom side is provided with accommodation means for a wheel shaft and attachment means for the wheel, and in which the vehicle attachment means are formed by a sleeve provided with means to connect the sleeve to a vehicle, in which the spline housing with splined shah is at least partially accommodated in the sleeve, in which the spline housing and the sleeve are mounted to each other by means of the suspension assembly, and the driving means are connected to the sleeve.

4. A wheel strut according to claim 3, in which the spline housing is provided with a receiving sleeve for a shaft which is positioned substantially perpendicular to the spline housing.

5. A wheel strut according to claim 3, wherein the suspension assembly buffs the vertical movement of the wheel attachment means with respect to the vehicle attachment means.

* * * * *